US011727694B2

United States Patent
Rishi et al.

(10) Patent No.: US 11,727,694 B2
(45) Date of Patent: Aug. 15, 2023

(54) SYSTEM AND METHOD FOR AUTOMATIC ASSESSMENT OF COMPARATIVE NEGLIGENCE FOR ONE OR MORE VEHICLES INVOLVED IN AN ACCIDENT

(71) Applicant: TANGERINE INNOVATION HOLDING INC., Menlo Park, CA (US)

(72) Inventors: Sumit Rishi, Bangalore (IN); Sunija Rishi, Bangalore (IN); Prashant Badaga, Bengaluru (IN); Kartavya Mohan Gupta, Cabin John, MD (US)

(73) Assignee: TANGERINE INNOVATION HOLDING INC., Menlo Park, CA (US)

( * ) Notice: Subject to any disclaimer, the term of this patent is extended or adjusted under 35 U.S.C. 154(b) by 64 days.

(21) Appl. No.: 17/564,202

(22) Filed: Dec. 28, 2021

(65) Prior Publication Data
US 2022/0284713 A1 Sep. 8, 2022

Related U.S. Application Data

(60) Provisional application No. 63/156,369, filed on Mar. 4, 2021.

(51) Int. Cl.
*G06V 20/58* (2022.01)
*G06V 20/56* (2022.01)
*G06V 10/82* (2022.01)
*G06T 7/20* (2017.01)
*G06V 10/764* (2022.01)

(52) U.S. Cl.
CPC .............. *G06V 20/588* (2022.01); *G06T 7/20* (2013.01); *G06V 10/764* (2022.01); *G06V 10/82* (2022.01); *G06V 20/582* (2022.01); *G06T 2207/10028* (2013.01); *G06T 2207/10044* (2013.01)

(58) Field of Classification Search
CPC .... G06V 20/588; G06V 10/764; G06V 10/82; G06V 20/582; G06V 10/454; G06V 20/40; G06V 20/58; G06T 7/20; G06T 2207/10028; G06T 2207/10044; G06T 2207/20081; G06T 2207/30241; G06T 2207/30256; G06F 18/22; G06F 18/251
See application file for complete search history.

(56) References Cited

U.S. PATENT DOCUMENTS 11,162,800 B1* 11/2021 Carbery ................. G01C 21/28
2017/0053461 A1* 2/2017 Pal .......................... G08G 1/012
(Continued)

*Primary Examiner* — Md K Talukder
(74) *Attorney, Agent, or Firm* — Benesch, Friedlander, Coplan & Aronoff LLP

(57) ABSTRACT

A system and a method for automatic assessment of comparative negligence of vehicle(s) involved in an accident. The system receives one or more of a video input, an accelerometer data, a gyroscope data, a magnetometer data, a GPS data, a Lidar data, a Radar data, a radio navigation data and a vehicle state data for vehicle(s). The system automatically detects an occurrence of an accident and its timestamp. The system then detects an accident type of the accident, and a trajectory of the vehicle(s) based on the received data for the detected timestamp. A scenario of the accident is generated and compared with a parametrized accident guideline to generate a comparative negligence assessment for the vehicle(s) involved in the accident.

20 Claims, 9 Drawing Sheets

(56) References Cited

U.S. PATENT DOCUMENTS

| | | | |
|---|---|---|---|
| 2021/0287530 A1* | 9/2021 | Reichardt | G06F 18/251 |
| 2021/0304592 A1* | 9/2021 | Lepp | G06Q 10/10 |
| 2022/0009525 A1* | 1/2022 | Aiko | G06Q 10/02 |
| 2022/0126864 A1* | 4/2022 | Moustafa | G06T 9/00 |
| 2022/0284713 A1* | 9/2022 | Rishi | G06V 20/588 |

\* cited by examiner

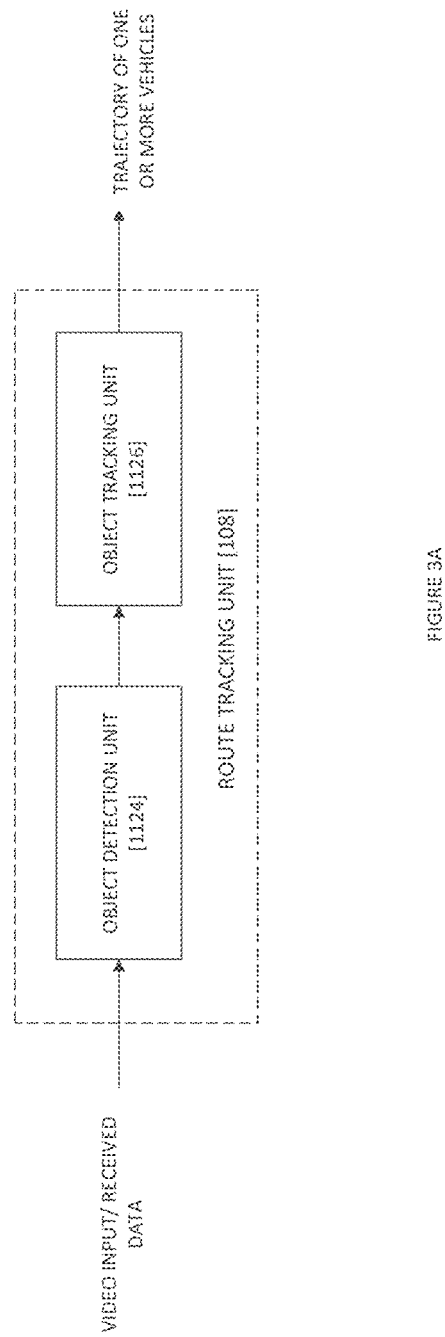

SYSTEM AND METHOD FOR AUTOMATIC ASSESSMENT OF COMPARATIVE NEGLIGENCE FOR ONE OR MORE VEHICLES INVOLVED IN AN ACCIDENT

CROSS-REFERENCE TO RELATED APPLICATIONS

The present application claims the benefit of priority under 35 U.S.C. § 119 from U.S. Provisional Patent Application No. 63/156,369 entitled "Method and system to determine and calculate Comparative Negligence Percentage of all parties involved in any motor vehicle accident," filed on Mar. 4, 2021, the disclosure of which is hereby incorporated by reference in its entirety for all purposes.

FIELD OF THE INVENTION

Embodiments of the present invention relates to a system and a method for automatic assessment of the comparative negligence for one or more vehicle(s) involved in an accident.

BACKGROUND

The following description of the related art is intended to provide background information pertaining to the field of the disclosure. This section may include certain aspects of the art that may be related to various features of the present invention. However, it should be appreciated that this section is used only to enhance the understanding of the reader with respect to the present invention, and not as admissions of the prior art.

Soon after an accident has happened between the vehicles, the assessment of liability of the drivers (or pilots) of the vehicles is initiated. This assessment is conducted to reveal the steps that may have been taken by the drivers to avoid the mishap, which generally are not clear immediately after the accident has happened. Often, after an accident, drivers (or the pilots) involved in the accident are not consistent with their narration of the events that occurred during the accident in the subsequent investigation by insurers, governmental agencies, etc. This assessment becomes more difficult in technically advanced vehicles implemented on autonomous and driver-assisted technologies, where the fault could also lie with the systems on the vehicle.

In another situation, the fault may also lie in the smart city infrastructure that manages the traffic. Also, the existing guidelines are inadequate in assigning the percentage of comparative negligence during an accident involving vehicles on the road and even in the air as they fail to provide solutions for the aforesaid limitations. Resultantly, the investigators, insurance surveyors, etc. spend considerable amount of time in performing the assessment to ascertain the percentage of responsibility of parties (vehicles, drivers, etc.) involved in the accident. And yet, the discovery could be misleading as the results would depend solely on human judgment. Thus, in view of the existing limitations, there is an imperative need for improved solutions for automatic assessment of the comparative negligence of drivers in accidents.

SUMMARY OF THE INVENTION

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present invention is to provide a system and a method for automatic assessment of the comparative negligence of the drivers involved in an accident. It is another objective of the present invention to provide a system and method for automating the assessment of comparative negligence of the drivers involved in an accident to exclude human judgement and human error from the assessment. It is yet another objective of the present invention to provide a system and method for minimising the time spent by the insurance surveyors in figuring out the relative blame of the parties involved in the accident. It is yet another objective of the present invention to provide a system and method for using data available on the vehicle to automatically assess the comparative negligence of the drivers involved in an accident. It is yet another objective of the present invention to provide an automated system and method of settlement of claims when autonomous vehicle(s) are involved in an accident. Other and additional objects of the invention will become more readily apparent upon reading the following detailed description and illustration of drawings.

A first aspect of the present invention relates to a method for automatic assessment of comparative negligence for one or more vehicles involved in an accident. The method comprises continuously receiving for at least one vehicle of the one or more vehicles, at a data input unit, one or more of a video input from a camera unit, a first data from an accelerometer, a second data from a gyroscope, a third data from a magnetometer, a fourth data from a Lidar sensor, a fifth data from a Radar sensor, a sixth data from a radio navigation unit, a GPS data from a GPS unit, and a vehicle state data from a vehicle interface (collectively referred as "received data"). Next, the method comprises automatically detecting, by an accident detection unit, an occurrence of an accident and a timestamp of said accident based on the received data. Subsequently, the method comprises determining, by an accident type detection unit, an accident type of the detected accident based on the received data. Next, the method comprises detecting, by a route tracking unit, a trajectory of the one or more vehicles based on the received data for the detected timestamp. Subsequently, the method comprises generating, by a context builder unit, a scenario for the accident for the detected timestamp based on at least one of the accident type and the trajectory of the one or more vehicles. Next, the method comprises comparing, by a context matching unit, said scenario with a parametrized accident guideline. Lastly, the method comprises generating, by a processor, a comparative negligence assessment for the one or more vehicles involved in the accident based on at least the comparison.

Another aspect of the present invention relates to the system for automatic assessment of comparative negligence for one or more vehicles involved in an accident. The system comprises a processor, an accident detection unit, a data input unit, a context matching unit, a context builder unit, a route tracking unit and an accident type detection unit, all the components are connected to each other and work in conjunction to achieve the objectives of the present invention. The data input unit is configured to continuously receiving, for at least one vehicle of the one or more vehicles, one or more of a video input from a camera unit, a first data from an accelerometer, a second data from a gyroscope, a third data from a magnetometer, a fourth data from a Lidar sensor, a fifth data from a Radar sensor, a sixth data from a radio navigation unit, a GPS data from a GPS unit, and a vehicle state data from a vehicle interface (collectively referred as "received data"). The accident detection unit is configured to automatically detect an occurrence of an accident and a timestamp of said accident based on the received data. The accident type detection unit is configured to determine an accident type of the detected accident based on the received data. The route tracking unit is configured to detect a trajectory of the one or more vehicles based on the received data for the detected timestamp. The context builder unit is configured to generate a scenario for the accident for said timestamp based on at least one of the accident type and the trajectory of the one or more vehicles. The context matching unit is configured to compare said scenario with a parametrized accident guideline. The processor is configured to generate a comparative negligence assessment for the one or more vehicles involved in the accident based on at least the comparison.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

FIG. 3A illustrates an exemplary route tracking unit, in accordance with exemplary embodiments of the present invention.

Figure 1:
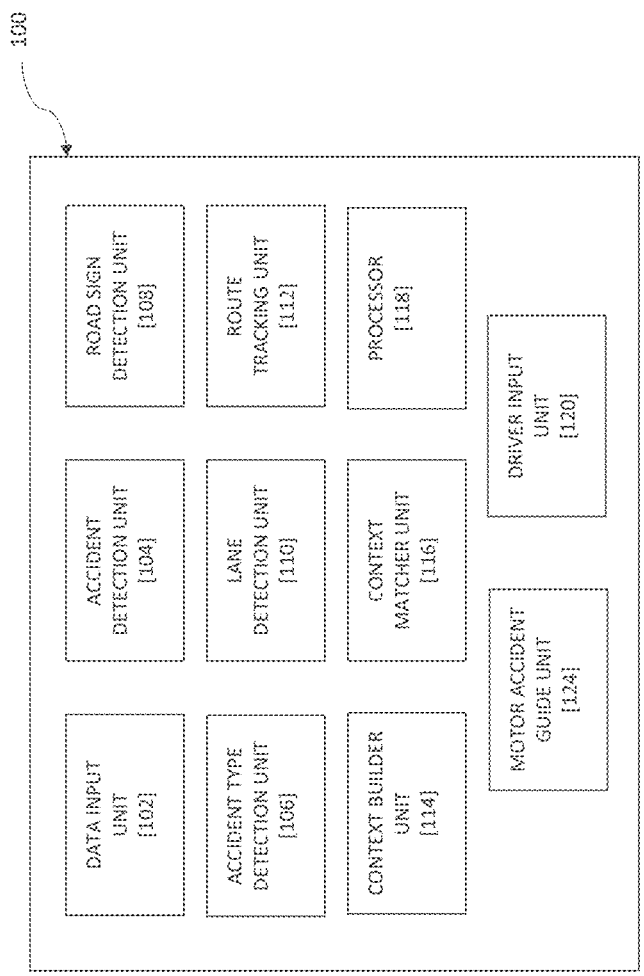
FIG. 1 illustrates an exemplary block diagram of the system of the present invention.

The foregoing shall be more apparent from the following more detailed description of the disclosure.

DETAILED DESCRIPTION OF THE INVENTION

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Also, it is noted that individual embodiments may be described as a process which is depicted as a flowchart, a flow diagram, a sequence diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a unit, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms "first", "second", etc. or "primary", "secondary", etc. are used to distinguish one element, set, data, object, step, process, function, activity or thing from another, and are not used to designate relative position, or arrangement in time or relative importance, unless otherwise stated explicitly. The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, a "vehicle" or "vehicular" or other similar term is inclusive of motor vehicles in general such as passenger automobiles including sports utility vehicles (SUV), buses, trucks, various commercial vehicles, watercraft including a variety of boats and ships, aerial vehicles including an aircraft and the like, and includes hybrid vehicles, electric vehicles, plug-in hybrid electric vehicles, hydrogen-powered vehicles and other alternative fuel vehicles (e.g. fuels derived from resources other than petroleum) and autonomous vehicle (e.g., driverless vehicles, vehicles installed with automated driving system, and capable of self-driving in auto-pilot mode, etc.). As referred to herein, a hybrid vehicle is a vehicle that has two or more sources of power, for example both gasoline-powered and electric-powered vehicles. Accordingly, as used herein, a "driver", a "pilot", a "captain" or other similar terms have been used interchangeably, and is referred to indicate an operator of the vehicle, and also includes operators of the autonomous vehicles that are capable of being controlled or piloted remotely, and the like.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. Furthermore, the term "processor" as used herein includes, but is not limited to one or more computers, hardwired circuits, signal modifying devices and systems, devices and machines for controlling systems, central processing units, programmable devices and systems, systems on a chip, systems comprised of discrete elements and/or circuits, state machines, virtual machines, data processors, processing facilities and combinations of any of the foregoing. The processor may perform signal coding data processing, input/output processing, and/or any other functionality that enables the working of the system according to the present invention. More specifically, the processor or processing unit is a hardware processor. The term "processor" as used herein means processing devices, apparatus, programs, circuits, components, systems and subsystems, whether implemented in hardware, tangibly-embodied software or both, and whether or not programmable.

As used herein, "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media. The memory unit as used herein is configured to retain data, whether on a temporary or permanent basis, and to provide such retained data to various units to perform their respective functions.

As disclosed in the background section the existing technologies have many limitations and in order to overcome at least some of the limitations of the prior known solutions, the present invention provides a solution for assessment of comparative negligence of the drivers of the one or more vehicles involved in an accident. More particularly, the present invention is directed to take out the human judgement and human error that existed in previously known systems and methods, and to provide a system and a method for automatic assessment of the comparative negligence for vehicle(s) involved in an accident with another vehicle (or as hereinafter also referred to as a "foreign vehicle"). The system and the method of the present invention takes into account the data received from the vehicle subsystems (a video input, an accelerometer data, a gyroscope data, a magnetometer data, a GPS data, and a vehicle state data, including ADAS fitted by original equipment manufacturers (OEM) or third party devices, along with the laws of the land for assessing the comparative negligence by excluding human judgement and human error from the comparative negligence assessment. Thus, owing to such advancement in comparative negligence assessment, the system and the method of the present invention minimises the time spent in figuring out the relative blame of the parties involved in the accident, for e.g., time spent by the insurance surveyors is decreased substantially.

Hereinafter, exemplary embodiments of the present invention will be described in detail with reference to the accompanying drawings so that those skilled in the art can easily carry out the present invention.

Referring to FIG. 1 illustrates an exemplary block diagram of the system [100] for automatic assessment of the comparative negligence of the drivers of the one or more vehicles involved in an accident. The system [100] comprises a data input unit [102], a processor [118], an accident detection unit [104], a route tracking unit [112], a context builder unit [114], a context matcher unit [116], a driver input unit [120] and an accident guide unit [124]. All the components of the system [100] are connected to each other and work in conjunction to achieve the aforementioned objectives of the present invention.

The present invention encompasses that the one or more vehicles involved in the accident includes the one or more vehicles directly involved and affected by the accident as well as other vehicles that may be present in vicinity of the directly-affected vehicles (e.g., passing-by vehicles, etc.) during the accident. In an exemplary embodiment, the system [100] of the present invention is implemented or installed inside at least one of the vehicles of the one or more vehicles for which the comparative negligence is to be assessed. In another exemplary embodiment, the system [100] is coupled to at least one of the vehicles of the one or more vehicles and fully or partly implemented on a remote server.

The data input unit [102] is connected to the accident detection unit [104], the context builder unit [114], the context matching unit [116], the route tracking unit [112], the accident type detection unit [106], a driver input unit [120], an accident guide unit [124] and the processor [118]. The data input unit [102] receives data from a plurality of sources. The data input unit [102] is configured to continuously receive one or more of a video input from a camera unit, a first data from an accelerometer, a second data from a gyroscope, a third data from a magnetometer, a fourth data from a Lidar sensor, a fifth data from a Radar sensor, a sixth data from a radio navigation unit, a GPS data from a GPS unit, and a vehicle state data from a vehicle interface (also hereafter referred to as "received data"). The data input unit [102] is also configured to transmit the received data to one or more of the accident detection unit [104], the context builder unit [114], the route tracking unit [112], the accident type detection unit [106], a driver input unit [120] and the processor [118].

In an instance, the present invention encompasses that the data input unit [102] receives data for the vehicle in which the system [100] is installed. In another instance, the present invention encompasses that the data input unit [102] receives data from at least one vehicle on a remotely-located system [100]. For example, the inputs may include but not limited to: videos recorded from one or more dashcams mounted on the vehicle, Inertial Measurement Unit (IMU) data (accelerometer, gyroscope, magnetometer) from an IMU sensor housing mounted on the vehicle, GPS data recorded by a GPS unit mounted on the vehicle, a radio navigation data, a vehicle state data (state of turn indicators, speed, RPM, brake pedal position, etc.) obtained from the vehicle interface. In another exemplary embodiment, the present invention encompasses that the data input unit [102] receives the data from the at least one vehicle of the one or more vehicles involved in an accident.

The accident detection unit [104] is connected to the data input unit [102], the context matching unit [116], the context builder unit [114], the route tracking unit [112], the accident type detection unit [106], a driver input unit [120] and the processor [118]. The accident detection unit [104] is configured to receive the received data from the data input unit [102]. The accident detection unit [104] is configured to automatically detect an occurrence of an accident and a timestamp of said accident based on the received data. In an exemplary embodiment, the present invention encompasses that the accident detection unit [104] detects occurrence of an accident and a timestamp of said accident based on video input from a camera unit. In another exemplary embodiment, the present invention encompasses that the accident detection unit [104] detects occurrence of an accident and a timestamp of said accident based on the first data from the accelerometer, the second data from the gyroscope, the third data from the magnetometer, the fourth data from the Lidar sensor, the fifth data from the Radar sensor and the sixth data from the radio navigation unit. Thus, the accident detection unit [104] detects whether the one or more vehicles are involved in the crash using either the video, or the IMU sensor data, or both to filter out spurious claims.

The timestamp of the accident detected by the accident detection unit [104] is used to extract one or more frames of the event from the video input (e.g., video snippet). In another exemplary embodiment, the timestamp of the accident detected by the accident detection unit [104] is used to extract the one or more details of the event based on the first data from the accelerometer, the second data from the gyroscope, the third data from the magnetometer, the fourth data from the Lidar sensor, the fifth data from the Radar sensor and the sixth data from the radio navigation unit. For example, the accident detection unit [104] extracts the one or more frames of event from video snippets or the IMU sensor data around the timestamp of the accident to find out further details of the accident. The timestamp of the accident is also further used to obtain additional information, such as weather conditions (slippery roads, visibility, etc.) at the time of accident and the road signs encountered by the one or more vehicles during the accident.

The accident type detection unit [106] is connected to the data input unit [102] the context builder unit [114], the route tracking unit [112], the accident detection unit [104], a driver input unit [120] and the processor [118]. The accident type detection unit [106] is configured to receive the received data from the data input unit [102]. The accident type detection unit [106] is configured to determine an accident type of the detected accident based on the received data. In an exemplary embodiment the present invention encompasses that the accident type is identified as one of the pre-defined accident types such as rear-end accident, a head-on accident, a T-bone accident, and a side-swipe accident.

The present invention encompasses that the fourth data from the Lidar sensor and the fifth data from the Radar sensor are used to generate a point cloud depicting one or more objects around the vehicles. The point cloud when analysed with the timestamp the accident and received data recreates the motion of the one or more objects and landmarks within the range of the Lidar and Radar sensors. Visualizing the point cloud in a visualization tool aid in identifying the shapes and structures of the one or more objects. The present invention also encompasses a 3D convolutional network trained with the received data to detect the one or more objects and a trajectory of the one or more objects, and an occurrence of the accident and the accident-type for the detected accident.

Figure 2:
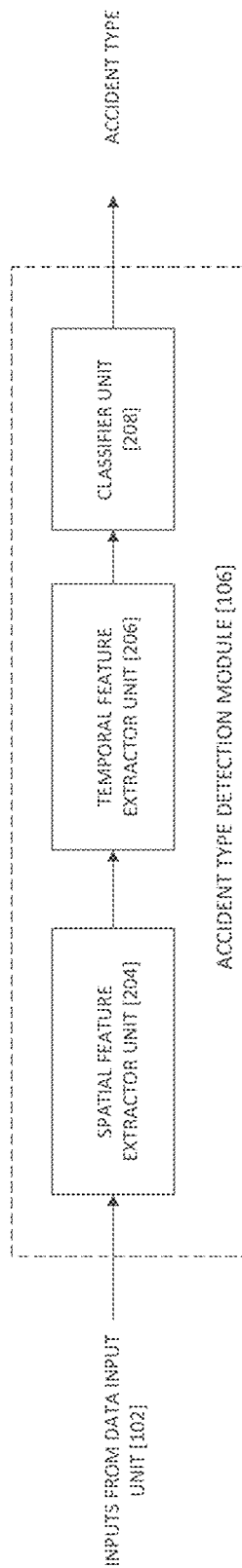
FIG. 2 illustrates an exemplary accident detection unit [104], in accordance with exemplary embodiments of the present invention.

Referring to FIG. 2 illustrates an exemplary block diagram of the accident type detection unit [106]. The accident type detection unit [106] further comprises of a spatial feature extractor unit [204], a temporal feature extractor unit [206] and a classifier unit [208]. The present invention encompasses that the received data is transmitted to the spatial feature extractor unit [204], the temporal feature extractor unit [206] and the classifier unit [208]. The spatial feature extractor unit [204] is configured to extract one or more spatial objects from the frames of the video snippet for the detected timestamp. In an exemplary embodiment, the present invention encompasses that the spatial feature extractor unit [204] extracts the one or more spatial objects from the video input using a combination of convolutional neural networks. The temporal feature extractor unit [206] is configured to extract one or more temporal features for the one or more spatial objects from the video input for a pre-defined time-period around the timestamp. In an exemplary embodiment, the present invention encompasses that the temporal feature extractor unit [206] extract one or more temporal features for the one or more spatial objects from the video input using recurrent neural networks. The classifier unit [208] is configured to determine the accident type. In an exemplary embodiment the present invention encompasses that the classifier unit [208] is trained with a dataset of the received data for one or more predefined accident types. The classifier unit [208] is trained to detect the accident type based on one or more of the temporal and spatial features extracted from a video dataset containing videos of various accident types and the trained dataset.

In another exemplary embodiment the present invention encompasses that the accident type detection unit [106] is configured to determine a point of impact based on at least one of the first data from the accelerometer, the second data from the gyroscope, the third data from the magnetometer, the fourth data from the Lidar sensor, the fifth data from the Radar sensor and the sixth data from the radio navigation unit. The classifier unit [208] is configured to determine the accident type based on the point of impact. The present invention further encompasses that the classifier unit [208] trained with a data set of the received data for one or more predefined accident types. The classifier unit [208] is trained to detect the accident type based on the determined point of impact and the trained dataset.

In yet another exemplary embodiment, the accident type detection unit [106] is configured to detect an accident type by preparing a small snippet comprising of one or more frames of the video input centred around the time of accident. The present invention encompasses that the accident type detection unit [106] receives the one or more frames from the accident detection unit [104]. The spatial feature extractor unit [204] of the accident type detection unit [106] uses a combination of convolutional neural networks to extract one or more features within each of the one or more frames. The temporal feature extractor unit [206] of the accident type detection unit [106] further uses recurrent neural networks to extract one or more temporal features and the interplay of the one or more features detected by the convolutional neural networks. The one or more features, one or more temporal features, and a relative importance information of the one or more features and the one or more temporal features, are all transmitted to the classifier unit [208]. The classifier unit [208] of the accident type detection unit [106] is further configured to classify the event captured in the snippet into one of the predefined accident types. In another exemplary embodiment the present invention encompasses that the accident type detection unit [106] uses the first data from the accelerometer, the second data from the gyroscope, the third data from the magnetometer, the fourth data from the Lidar sensor, the fifth data from the Radar sensor and the sixth data from the radio navigation unit of the one or more vehicles to detect the accident type. The accident type detection unit [106] analyses the forces experienced in the three axes of the accelerometer and the three axes of the gyroscope. The analysis indicate to the point of impact with a frame of reference of the vehicle which can then be mapped to one of the predefined accident types.

The route tracking unit [112] is connected to the accident detection unit [104], the context matching unit [116], the context builder unit [114], the data input unit [102], the accident type detection unit [106], a driver input unit [120] and the processor [118]. The route tracking unit [112] is configured to receive the received data from the data input unit [102]. The route tracking unit [112] is configured to receive the one or more frames extracted by the accident detection unit [104]. The route tracking unit [112] is configured to detect a trajectory of the one or more vehicles based on the received data for the detected timestamp. The present invention encompasses that the route tracking unit [112] detects the trajectory of the one or more vehicles for a predefined time around (i.e., before and after) the timestamp of the accident. For example, the route tracking unit [112] is configured to determine the trajectory of the one or more vehicles involved in an accident based on analysis of the video input of the accident and the first data from the accelerometer, the second data from the gyroscope, the third data from the magnetometer, the fourth data from the Lidar sensor, the fifth data from the Radar sensor and the sixth data from the radio navigation unit. The route tracking unit [112] uses techniques related to video processing and IMU data processing for detecting trajectories of the one or more vehicles. The present invention encompasses that the route tracking unit [112] also detects the right of the way for the one or more vehicles for the detected trajectories of the one or more vehicles. For example, the route tracking unit [112] detects the right of the path for one or more aircrafts involved in an accident based on analysis of the trajectory of the one or more aircrafts and the predetermined routes assigned to the aircraft.

Referring to FIG. 3A illustrates an exemplary route tracking unit [108]. In an exemplary embodiment the present invention encompasses that the route tracking unit [112] comprises of an object detection unit [1124] and an object tracking unit [1126]. The object detection unit [1124] is configured to identify one or more stationary objects such as sign boards, poles, railings etc. in the one or more frames. The object tracking unit [1126] is configured to detect the trajectory of the one or more vehicles involved in the accident by tracking the movement of the one or more stationary objects relative to the movement of the one or more vehicles in the one or more frames. In an exemplary implementation, the object tracking unit [1126] determines a trajectory of a first vehicle of the one or more vehicles, and subsequent to determining the first vehicle's trajectory, the object tracking unit [1126] determines the trajectory of second vehicle (or nth vehicle) of the one or more vehicles by using object tracking and relative position of the second (or nth) vehicle within the frame.

In another exemplary embodiment the present invention encompasses that the route tracking unit [112] also uses the first data from the accelerometer, the second data from the gyroscope, the third data from the magnetometer, the fourth data from the Lidar sensor, the fifth data from the Radar sensor and the sixth data from the radio navigation unit for a vehicle to construct the trajectory of the vehicle using the laws of motion which can further be improved using a GAN (Generative Adversarial Networks, deep neural networks trained to generate plausible routes given the sensor data). In another exemplary embodiment the present invention encompasses that the object tracking unit [1126] uses visual odometry techniques to determine trajectory of the one or more vehicles The context builder unit [114] is connected to the accident detection unit [104], the context matching unit [116], the route tracking unit [112], the data input unit [102], the accident type detection unit [106], a driver input unit [120] and the processor [118]. The context builder unit [114] is configured to receive the received data from the data input unit [102]. The context builder unit [114] is configured to receive the accident type from the accident type detection unit [106]. The context builder unit [114] is configured to receive the trajectory of the one or more vehicles from the accident type detection unit [106]. The context builder unit [114] is configured to generate a scenario of the accident for said timestamp based on at least one of the accident type and the trajectory of the one or more vehicles.

The present invention also encompasses usage of a parameterized accident guide (e.g., guidebook, manual, etc.) to determine the comparative negligence of the one or more vehicles involved in the accident, for e.g., publicly-available accident guides issued by regulatory bodies and/or governmental agencies. The present invention encompasses that a collection of such publicly-available accident guides is stored in an accident guide unit [124]. Thus, the accident guide unit [124] lists all the possible scenarios of an accident, and assigns a relative culpability to the one or more vehicles involved in the accident in the listed scenarios. Each of the scenarios in the guide are mapped to a context which can be compared with each other. In another exemplary embodiment the present invention encompasses that the context builder unit [114] is configured to prepare a context of one or more events leading to the accident based on the at least one of the accident type and the trajectory of the one or more vehicles. The context matcher unit [116] is configured to compare the context of the accident with that of the scenarios listed in the accident guide and presents the matching percentages with the context of the event. The timeline prepared by the context builder unit [114] is based on the trajectories of the one or more vehicles, point of impact, accident type, state of vehicle parameters, etc. While the above listed factors are limited in number, the present invention also encompass other similar factors or parameters or considerations that shall aid in generating a scenario.

The processor [118] is connected to the accident detection unit [104], the context matching unit [116], the context builder unit [114], the route tracking unit [112], the data input unit [102], the accident type detection unit [106], a driver input unit [120], and an accident guide unit [124]. The processor [118] is configured to receive the matching percentage from the context builder unit [114]. The processor [118] is configured to generate a comparative negligence assessment for the one or more vehicles involved in the accident based on the comparison. For instance, the comparative negligence assessment reveals which vehicle of the one or more vehicles is responsible for the accident, and the like. The comparative negligence assessment also reveals the fault of the one or more vehicles involved in the accident, and the like. The comparative negligence assessment also reveals the liability of the one or more vehicles due to the accident, and the like. The processor [118] is also configured to generate a report on the comparative negligence assessment of the one or more vehicles involved in the accident. In an instance, the report may comprise information regarding the one or more vehicle(s) responsible for the accident, a fault determination (e.g., relative culpability (%), etc.) and a liability determination (damages, etc.) for the one or more vehicle(s) involved in the accident, and such other information necessary for reporting settlement of claims in an accident.

The driver input unit [120] is connected to the accident detection unit [104], the context matching unit [116], the context builder unit [114], the route tracking unit [112], the data input unit [102], the accident type detection unit [106] and the processor [118]. The present invention encompasses that one or more vehicles involved in the accident is an autonomous vehicle, including partially-autonomous and fully-autonomous vehicles. Accordingly, the driver input unit [120] is configured to detect an engagement score of a driver for the at least one autonomous vehicle of the one or more vehicles involved in the accident to determine relative culpability of the driver (or the pilot) I the autonomous vehicle in occurrence of the accident. The engagement score is also calculated based on determining possible actions that could have been taken by the driver to avert the accident. The engagement score is also calculated based on determining actions, if any, taken by the driver to avert the accident. The engagement score is calculated based on the received data. In this regard, the driver input unit [120] detects an engagement score of a driver of the one or more vehicles based on the received data. For instance, the driver input unit [120] determines an engagement score of the vehicle based on the vehicle state data like ADAS engagement levels, driver steering input, pedal position and skid sensor values. The scenarios generated by the context builder unit [114] also takes into consideration the engagement score of the driver of the one or more vehicles, to determine whether any actions of the driver were responsible for occurrence of the accidents and that was contrary to preventing the accident. Once the matching scenarios are found from the parametrized accident guide by the context matching unit [116], the relative culpability is determined as per the parametrized accident guide by the processor [118].

In another instance, in an event at least one vehicle of the one or more vehicles involved in the accident is an automobile, the system [100] may also comprise a road sign detection unit [108] connected to the accident detection unit [104], the context builder unit [114], the route tracking unit [112], the data input unit [102], the accident type detection unit [106], a driver input unit [120], an accident guide unit [124] and the processor [118]. The road sign detection unit [108] is configured to receive the received data from the data input unit [102]. The road sign detection unit [108] is also configured to receive the one or more frames from the accident detection unit [104]. For a road-based accident between one or more motor vehicles, the road sign detection unit [108] is configured to detect one or more road signs for the detected timestamp based on the received data. The road sign detection unit [108] is configured to parse the one or more frames identified by the accident detection unit [104] to detect the one or more road signs. The road signs may include but are not limited to, give way, stop, no entry, one-way traffic, no vehicles in both directions, no entry for cycles, no entry for goods vehicles, etc. The road sign detection unit [108] is also configured to detect one or more traffic lights and a status of the individual lamps of the one or more traffic lights.

Figure 3B:
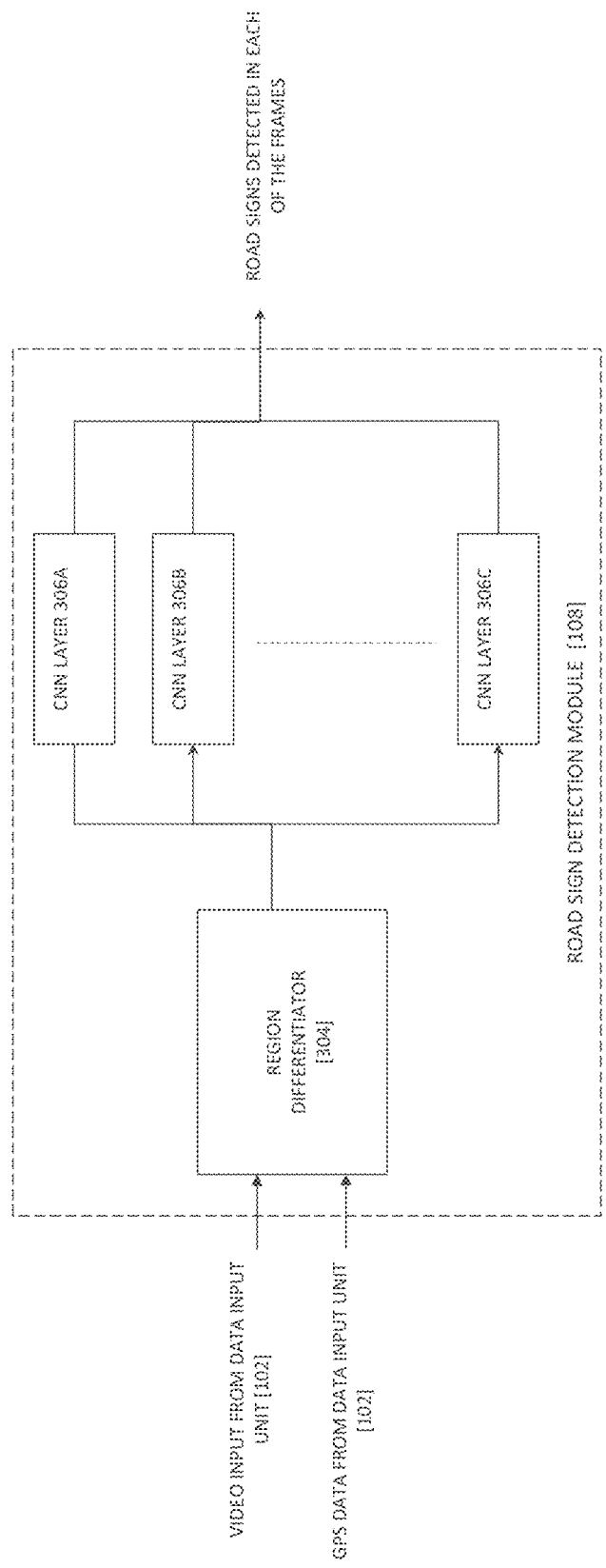
FIG. 3B illustrates an exemplary road sign detection unit, in accordance with exemplary embodiments of the present invention.

In an exemplary embodiment the present invention encompasses that the road sign detection unit [108] comprises of one or more convolutional neural networks (e.g., multiple layers of convolutional neural networks) trained with datasets containing multiple images of the road signs. The road sign detection unit [108] detects the one or more road signs in one or more frames using one or more layers of convolutional neural network. Referring to FIG. 3B illustrates an exemplary road sign detection unit [108]. The road sign detection unit [108] comprises of a region differentiator [304] and one or more layers of convolutional neural network. The road sign detection unit [108] receives the video input and the GPS data from the data input unit [102]. In an exemplary embodiment, upon receiving GPS data along with the video input (e.g., dashcam videos, etc.) from the data input unit [102], the road sign detection unit [108] uses high-definition (HD) maps to extract and detect the road signs for the location of the one or more vehicles involved in an accident. The present invention encompasses that the road sign detection unit [108] uses either pre-stored HD maps or publicly available HD maps of the location based on the GPS data. Further, using the timestamp identified by the accident detection unit [104], the road sign detection unit [108] maps the road signs obtained from the HD maps to the frames in the video snippet. In another exemplary embodiment, the road sign detection unit [108] compares the road signs obtained from the HD maps to the one or more road signs detected by the one or more layer of the convolutional neural network, to map the road signs to the frames in the video snippet.

The system [100] may also comprise a lane detection unit [110] is connected to the accident detection unit [104], the context builder unit [114], the route tracking unit [112], the road sign detection unit [108], the data input unit [102], the accident type detection unit [106], a driver input unit [120], an accident guide unit [124] and the processor [118]. The lane detection unit [110] is configured to receive the received data from the data input unit [102]. For a road-based accident between one or more motor vehicles, the lane detection unit [110] is configured to detect one or more lane markings on the road, a position of the one or more vehicles with respect to the one or more lane markings, and a lane driving behaviour of the one or more vehicles based on the video input. The present invention encompasses that the lane detection unit [110] is further configured to identify the one or more lane markings in the video input using one of a computer vision technique or deep learning mechanism.

Upon identification of the one or more lane markings, the lane detection unit [110] is configured to detect a position the one or more vehicles with respect to the one or more lane markings based on an analysis of one of the video input or the one or more frames extracted by the accident detection unit [104]. For instance, once the lane markings are detected in the one or more frames, the frames are passed through a perspective transformer of the lane detection unit [110] to generate a birds eye view of the one or more frames (e.g., a top view) in which the position of the one or more vehicles is determined using the relative position of the lane markings in the one or more frames. The present invention also encompass that the timestamp of the accident where the lane change happens are also determined using the birds eye view. The lane detection unit [110] is further configured to detect a lane driving behaviour for each of the one or more vehicles involved in the accident based on a comparison of the detected one or more lane markings and the positions of the one or more vehicles with respect to the lane markings. The present invention encompasses lane detection behaviour is one of a safe driving or an unsafe driving. For example, if the comparison of the detected one or more lane markings and the position of a vehicle with respect to the one or more lane markings, reveals that the vehicle is driven in-lane, the lane driving behaviour is detected to be safe-driving. However, if the comparison of the detected one or more lane markings and the position of a vehicle with respect to the one or more lane markings, reveals that the vehicle is not driven in-lane, the lane driving behaviour is detected to be unsafe-driving.

The present invention encompasses that the context builder unit [114] is configured to receive the one or more road signs from the road sign detection unit [108]. The present invention also encompasses that the context builder unit [114] is configured to receive one or more lane markings, a position of the one or more vehicles with respect to the one or more lane markings, and a lane driving behaviour of the one or more vehicles from the lane detection unit [110]. For a road-based accident involving one or more motor vehicles, the context builder unit [114] is further configured to generate the scenario for the accident based on at least the one or more road signs and the lane driving behaviour of the one or more vehicles.

In another instance, in an event at least one vehicle of the one or more vehicles involved in the accident is an aerial vehicle, the data input unit [102] is further configured to receive a terrain information, a synthetic environmental data and a flight plan data (collectively referred to as the "received data") for at least one vehicle of the one or more vehicles. The data input unit [102] may receive the terrain information, the synthetic environmental data. The route tracking unit [112] in such instances are configured to detect a flight trajectory (and/or a flight path) for the at least one aerial vehicle based on the received data. For instance, the route tracking unit [112] detects the flight trajectory (and/or flight path) of the at least one aerial vehicle based on the video input from the camera unit, the first data from the accelerometer, the second data from the gyroscope, the third data from the magnetometer, the fourth data from the Lidar sensor, the fifth data from the Radar sensor, the sixth data from the radio navigation unit and the GPS data from the GPS unit, and the vehicle state data from the vehicle interface, the terrain information, the synthetic environmental data and the flight plan data. Further, in such instances, the context builder unit [114] is further configured to generate the scenario for the aerial accident based on the received data. The context matching unit [116] is further configured to compare the generated scenario with the parametrized accident guideline (for aerial vehicles) and the processor [118] is configured to generate a comparative negligence assessment for the one or more vehicles involved in the accident based on at least the comparison.

Further, in the event the at least one vehicle of the one or more vehicles involved in the accident is an aerial vehicle, the parametrized accident guideline comprises of filed flight plans, unfiled flight plans the vehicle should take across phases of flight as established by the relevant (regional or international) aviation authorities. Further, the parametrized accident guideline takes into consideration at least a type of the aerial vehicle, a size of the aerial vehicle, a time of flight, at least one authorized deviations from flight plan, at least one unauthorized deviations from flight plan, at least one controlled deviations from flight plan and at least one uncontrolled deviations from flight plan. Thus, the parametrized accident guideline takes into consideration any deviations from the flight plan due to adverse weather phenomenon or vehicle malfunctions or situations involving third party vehicle or cultural features. The parametrized accident guideline thus also comprises details regarding right of way for aerial vehicles based on the above factors. In another instance, the present invention encompasses that the context matching unit [116] compares the generated scenario with the right of way of the parametrized accident guideline (for aerial vehicles) and the processor [118] generates a comparative negligence assessment for the one or more vehicles involved in the accident based on at least the comparison.

Figure 4:
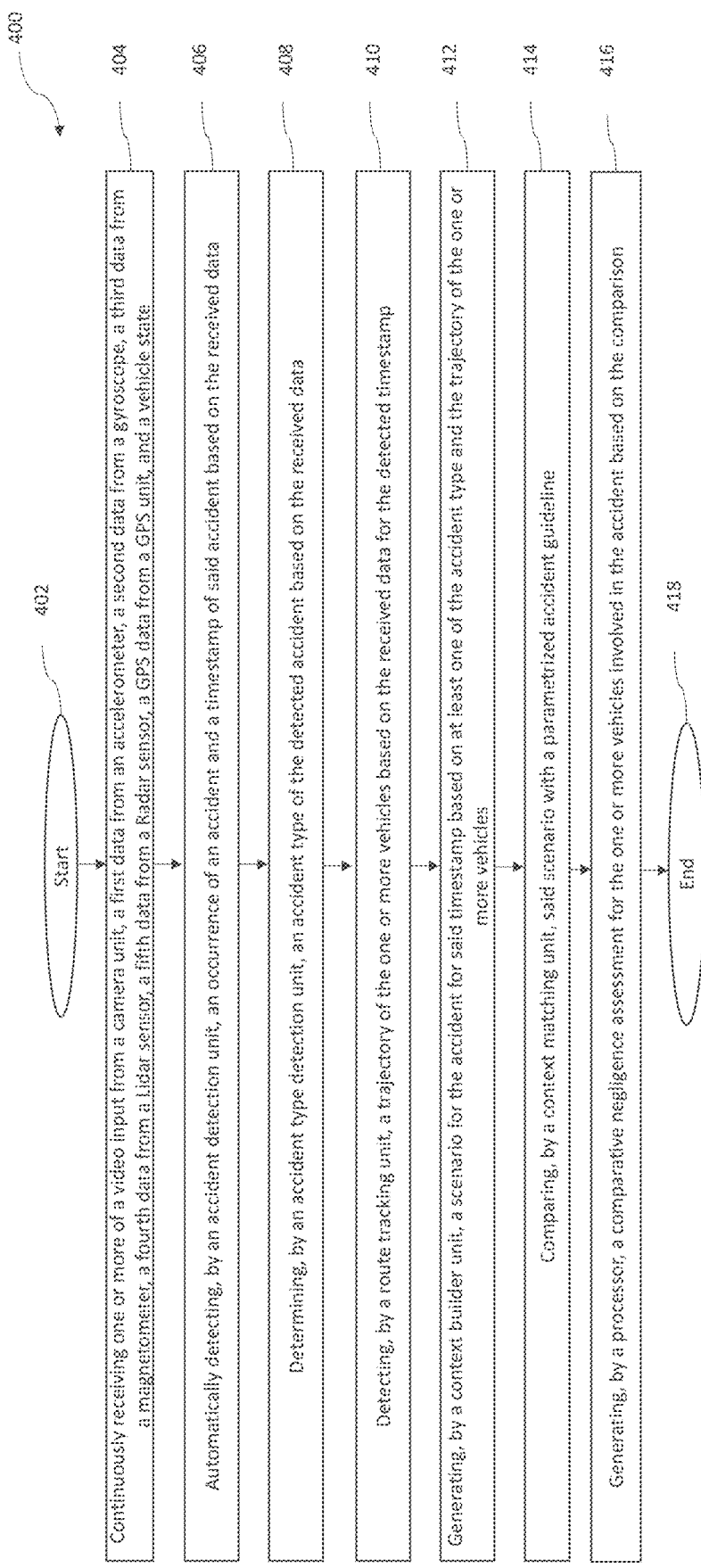
FIG. 4 illustrates an exemplary method flow diagram [300] depicting method for comparative negligence assessment, in accordance with exemplary embodiments of the present invention.

FIG. 4 illustrates an exemplary method flow diagram [400] depicting method for comparative negligence assessment, in accordance with exemplary embodiments of the present invention. The method starts at step [402], for example, when a vehicle is started, or anytime during a trip of the vehicle. At step [404], the data input unit [102] continuously receives one or more of a video input from a camera unit, a first data from an accelerometer, a second data from a gyroscope, a third data from a magnetometer, a fourth data from a Lidar sensor, a fifth data from a Radar sensor, a sixth data from a radio navigation unit, a GPS data from a GPS unit, and a vehicle state data from a vehicle interface for one or more vehicles. The present invention also encompasses that the data input unit [102] also continuously transmits the received data to one or more of the accident detection unit [104] the context builder unit [114], the route tracking unit [112], the accident type detection unit [106], a driver input unit [120], and the processor [118].

At step [406], the accident detection unit [104] automatically detects an occurrence of an accident and a timestamp of said accident based on the received data. The accident detection unit [104] detects occurrence of the accident and the timestamp of said accident based on video input from a camera unit. In another exemplary embodiment, the accident detection unit [104] detects occurrence of an accident and a timestamp of said accident based on the first data from the accelerometer, the second data from the gyroscope, the third data from the magnetometer, the fourth data from the Lidar sensor, the fifth data from the Radar sensor and the sixth data from the radio navigation unit. The timestamp of the accident detected by the accident detection unit [104] is used to extract the one or more details of the event based on the first data from the accelerometer, the second data from the gyroscope, the third data from the magnetometer, the fourth data from the Lidar sensor, the fifth data from the Radar sensor and the sixth data from the radio navigation unit. For example, the accident detection unit [104] extracts the one or more frames of event from video snippets or the IMU sensor data around the timestamp of the accident to find out further details of the accident. The timestamp of the accident is also further used to obtain additional information, such as weather conditions (slippery roads, visibility, etc.) at the time of accident and the road signs encountered by the one or more vehicles during the accident.

At step [408], the accident type detection unit [106] determines an accident type of the detected accident based on the received data. The present invention encompasses that the accident type is pre-defined. The present invention encompasses that the accident type is at least one of a rear-end accident, a head-on accident, a T-bone accident, and a side-swipe accident. In an exemplary embodiment the spatial feature extractor unit [204] of the accident type detection unit [106] extracts one or more spatial objects from the video input for the detected timestamp, for e.g., using a combination of convolutional neural networks. Next, the temporal feature extractor unit [206] extracts one or more temporal features for the one or more spatial objects from the video input for a predefined time-period around the timestamp. Subsequently, the temporal feature extractor unit [206] extracts one or more temporal features for the one or more spatial objects from the video input using recurrent neural networks. Further next, the classifier unit [208] trained with a dataset of the received data for one or more predefined accident types, determines the accident type based on an analysis of the one or more temporal features, the one or more spatial objects and the trained dataset.

In another exemplary embodiment, the accident type detection unit [106] determines a point of impact based on at least one of the first data from the accelerometer, the second data from the gyroscope, the third data from the magnetometer, the fourth data from the Lidar sensor, the fifth data from the Radar sensor and the sixth data from the radio navigation unit. Next, the classifier unit [208] determines the accident type based on the point of impact. Subsequently, the classifier unit [208] trained with a data set of the received data for one or more predefined accident types, determines the accident type based on an analysis of the point of impact and the dataset.

In yet another exemplary embodiment, the accident type detection unit [106] detects an accident type by preparing a small snippet comprising of one or more frames of the video input centred around the time of accident. The spatial feature extractor unit [204] of the accident type detection unit [106] uses a combination of convolutional neural networks to extract one or more features within each of the one or more frames. Next, the temporal feature extractor unit [206] of the accident type detection unit [106] further uses recurrent neural networks to extract one or more temporal features and the interplay of the one or more features detected by the convolutional neural networks. The one or more spatial features, one or more temporal features, and a relative importance information of the one or more spatial features and the one or more temporal features, are all transmitted to the classifier unit [208]. Subsequently, the classifier unit [208] of the accident type detection unit [106] classifies the event captured in the snippet into one of the predefined accident types. In another exemplary embodiment the accident type detection unit [106] uses the first data from the accelerometer, the second data from the gyroscope, the third data from the magnetometer, the fourth data from the Lidar sensor, the fifth data from the Radar sensor and the sixth data from the radio navigation unit of the one or more vehicles to detect the accident type. The accident type detection unit [106] analyses the forces experienced in the three axes of the accelerometer and the three axes of the gyroscope. The analysis indicate to the point of impact with a frame of reference of the vehicle which can then be mapped to one of the predefined accident types.

At step [410], the route tracking unit [112] detects a trajectory of the one or more vehicles based on the received data for the detected timestamp. For example, the route tracking unit [112] is configured to determine the trajectory of the one or more vehicles involved in an accident based on analysis of the video input and the first data from the accelerometer, the second data from the gyroscope, the third data from the magnetometer, the fourth data from the Lidar sensor, the fifth data from the Radar sensor and the sixth data from the radio navigation unit. The present invention encompasses that the route tracking unit [112] also detects the right of the way for the one or more vehicles for the detected trajectories of the one or more vehicles. The present invention also encompasses that the route tracking unit [112] uses techniques related to video processing and IMU data processing for detecting trajectories of the one or more vehicles. In an exemplary embodiment, the object detection unit [1124] of the route tracking unit [112] identifies one or more stationary objects such as sign boards, poles, railings etc. in the one or more frames. The object tracking unit [1126] of the route tracking unit [112] detects the trajectory of the one or more vehicles involved in the accident by tracking the movement of the one or more stationary objects relative to the movement of the one or more vehicles in the one or more frames. The object tracking unit [1126] of the route tracking unit [112] determines a trajectory of a first vehicle of the one or more vehicles, and subsequent to determining the first vehicle's trajectory, the object tracking unit [1126] determines the trajectory of second vehicle (or nth vehicle) of the one or more vehicles by using object tracking and relative position of the second (or nth) vehicle within the frame.

In another exemplary embodiment, the route tracking unit [112] also uses the first data from the accelerometer, the second data from the gyroscope, the third data from the magnetometer, the fourth data from the Lidar sensor, the fifth data from the Radar sensor and the sixth data from the radio navigation unit for a vehicle to construct the trajectory of the vehicle using the laws of motion which can further be improved using a GAN (Generative Adversarial Networks, deep neural networks trained to generate plausible routes given the sensor data). In another exemplary embodiment, the object tracking unit [1126] uses visual odometry techniques to determine trajectory of the one or more vehicles.

At step [412], the context builder unit [114] generates a scenario for the accident for said timestamp based on at least one of the accident type, the one or more road signs, the lane driving behaviour of the one or more vehicles, and the trajectory of the one or more vehicles. The context builder unit [114] generates a scenario of the accident for said timestamp based on at least one of the accident type and the trajectory of the one or more vehicles. In an exemplary embodiment, the context builder unit [114] prepares a context of one or more events leading to the accident based on the at least one of the accident type, the one or more road signs, one or more lane markings, a position of the one or more vehicles with respect to the one or more lane markings, the lane driving behaviour of the one or more vehicles and the trajectory of the one or more vehicles.

At step [414], the context matching unit [116] compares said scenario with a parametrized motor vehicle guideline. The context matcher unit [116] compares the context of the accident with that of the scenarios listed in the accident guide and presents the matching percentages with the context of the event. Lastly, at step [416], the processor [118] generates a comparative negligence assessment for the one or more vehicles involved in the accident based on the comparison. For instance, the processor [118] receives the matching percentage from the context builder unit [114] and generates a comparative negligence assessment for the one or more vehicles involved in the accident based on the comparison. For instance, the comparative negligence assessment reveals which vehicle of the one or more vehicles is responsible for the accident, and the like. The comparative negligence assessment also reveals the fault of the one or more vehicles involved in the accident, and the like. The comparative negligence assessment also reveals the liability of the one or more vehicles involved in the accident, and the like. The method completes at step [418].

The method of the present invention further encompasses generating, by the processor [118], a report on the comparative negligence assessment of the one or more vehicles involved in the accident. For example, the report may comprise information regarding the one or more vehicle(s) responsible for the accident, a fault determination (e.g., relative culpability (%), etc.) and a liability determination (damages, etc.) for the one or more vehicle(s) involved in the accident, and such other information necessary for reporting settlement of claims in an accident.

The method of the present invention encompass detecting, by a driver input unit [120], an engagement score of a driver for the at least one autonomous vehicle of the one or more vehicles involved in the accident to determine relative culpability of the driver (or the pilot) vis-a-vis the autonomous vehicle in occurrence of the accident. The engagement score is also calculated based on determining possible actions that could have been taken by the driver to avert the accident. The engagement score is also calculated based on determining actions, if any, taken by the driver to avert the accident. The engagement score is calculated based on the received data. The present invention further encompasses that the context builder unit [114] generates the scenario based on at least said engagement score. For instance, the driver input unit [120] determines an engagement score of the vehicle based on the vehicle state data like ADAS engagement levels, driver steering input, pedal position and skid sensor values. The scenarios generated by the context builder unit [114] also takes into consideration the engagement score of the driver of the one or more vehicles, to determine whether any actions of the driver were responsible for occurrence of the accidents and that was contrary to preventing the accident. Once the matching scenarios are found from the parametrized accident guide by the context matching unit [116], the relative culpability is determined as per the parametrized accident guide and the processor [118].

For a road-based accident between one or more motor vehicles, the present invention encompasses that the road sign detection unit [108] detects one or more road signs for the detected timestamp based on the received data. The road sign detection unit [108] parses the one or more frames identified by the accident detection unit [104] to detect the one or more road signs. The road sign detection unit [108] detects the one or more road signs based on a comparison of the one or more frames and the one or more layer of convolutional neural network trained with datasets containing multiple images of the road signs. In another exemplary embodiment, the road sign detection unit [108] receives the video input and the GPS data from the data input unit [102]. Upon receiving GPS data along with the video input (e.g., dashcam videos, etc.) from the data input unit [102], the road sign detection unit [108] uses high-definition (HD) maps to extract and detect the road signs for the location of the one or more vehicles involved in an accident. Further, the road sign detection unit [108] uses either pre-stored HD maps or publicly available HD maps of the location based on the GPS data. Further, using the timestamp identified by the accident detection unit [104], the road sign detection unit [108] maps the road signs obtained from the HD maps to the frames in the video snippet. In another exemplary embodiment, the road sign detection unit [108] compares the road signs obtained from the HD maps to the one or more road signs detected by the one or more layer of the convolutional neural network, to map the road signs to the frames in the video snippet.

Further, for such road-based accident between one or more motor vehicles, the present invention also encompasses that the lane detection unit [110] detects one or more lane markings, a position of the one or more vehicles with respect to the one or more lane markings, and a lane driving behaviour of the one or more vehicles in the video input data. The present invention encompasses that the lane detection unit [110] is further configured to identify the one or more lane markings in the video input using one of a computer vision technique or deep learning mechanism.

In an exemplary embodiment, upon identification of the one or more lane markings, the lane detection unit [110] detects a position of the one or more vehicles with respect to the one or more lane markings based on an analysis of one of the video input or the one or more frames extracted by the accident detection unit [104]. For instance, once the lane markings are detected in the one or more frames, the frames are passed through a perspective transformer of the lane detection unit [110] to generate a birds eye view of the one or more frames (e.g., a top view) in which the position of the one or more vehicles is determined using the relative position of the lane markings in the one or more frames. The present invention also encompasses that the timestamp of the accident where the lane change happens are also determined using the birds eye view. The lane detection unit [110] also detects a lane driving behaviour for each of the one or more vehicles involved in the accident based on a comparison of the detected one or more lane markings and the positions of the one or more vehicles with respect to the lane markings. The present invention encompasses lane detection behaviour is one of a safe driving or an unsafe driving. For example, if the comparison of the detected one or more lane markings and the position of a vehicle with respect to the one or more lane markings, reveals that the vehicle is driven in-lane, the lane driving behaviour is detected to be safe-driving. However, if the comparison of the detected one or more lane markings and the position of a vehicle with respect to the one or more lane markings, reveals that the vehicle is not driven in-lane, the lane driving behaviour is detected to be unsafe-driving.

The method of the present invention also encompasses that for such road-based accident involving one or more motor vehicles, the context builder unit [114] receive the one or more road signs from the road sign detection unit [108], and the one or more lane markings, the position of the one or more vehicles with respect to the one or more lane markings, and the lane driving behaviour of the one or more vehicles from the lane detection unit [110]. Next, the context builder unit [114] generates the scenario for the accident based on at least the one or more road signs and the lane driving behaviour of the one or more vehicles. Further next, the generated scenario is compared with the parametrized accident guideline by the context matching unit [116], and lastly the processor [118] generates the comparative negligence assessment for the one or more motor vehicles involved in the road-based accident based on at least the comparison.

In another instance, in an event at least one vehicle of the one or more vehicles involved in the accident is an aerial vehicle, the method encompasses that the data input unit [102] receives a terrain information, a synthetic environmental data and a flight plan data (collectively referred to as the "received data") for at least one vehicle of the one or more vehicles. The data input unit [102] may receive the terrain information, the synthetic environmental data. The route tracking unit [112] in such instances detects a flight trajectory (and/or a flight path) for the at least one aerial vehicle based on the received data. For instance, the route tracking unit [112] detects the flight trajectory (and/or flight path) of the at least one aerial vehicle based on the video input from the camera unit, the first data from the accelerometer, the second data from the gyroscope, the third data from the magnetometer, the fourth data from the Lidar sensor, the fifth data from the Radar sensor, the sixth data from the radio navigation unit and the GPS data from the GPS unit, and the vehicle state data from the vehicle interface, the terrain information, the synthetic environmental data and the flight plan data. Further, in such instances, the context builder unit [114] generates the scenario for the aerial accident based on the received data. The context matching unit [116] compares the generated scenario with the parametrized accident guideline (for aerial vehicles) and the processor [118] generates a comparative negligence assessment for the one or more vehicles involved in the accident based on at least the comparison.

Further, in the event the at least one vehicle of the one or more vehicles involved in the accident is an aerial vehicle, the parametrized accident guideline comprises of filed flight plans, unfiled flight plans the vehicle should take across phases of flight as established by the relevant (regional or international) aviation authorities. Further, the parametrized accident guideline takes into consideration at least a type of the aerial vehicle, a size of the aerial vehicle, a time of flight, at least one authorized deviations from flight plan, at least one unauthorized deviations from flight plan, at least one controlled deviations from flight plan and at least one uncontrolled deviations from flight plan. Thus, the parametrized accident guideline takes into consideration any deviations from the flight plan due to adverse weather phenomenon or vehicle malfunctions or situations involving third party vehicle or cultural features. The parametrized accident guideline thus also comprises details regarding right of way for aerial vehicles based on the above factors. In another instance, the present invention encompasses that the context matching unit [116] compares the generated scenario with the right of way of the parametrized accident guideline (for aerial vehicles) and the processor [118] generates a comparative negligence assessment for the one or more vehicles involved in the accident based on at least the comparison.

Figure 5:
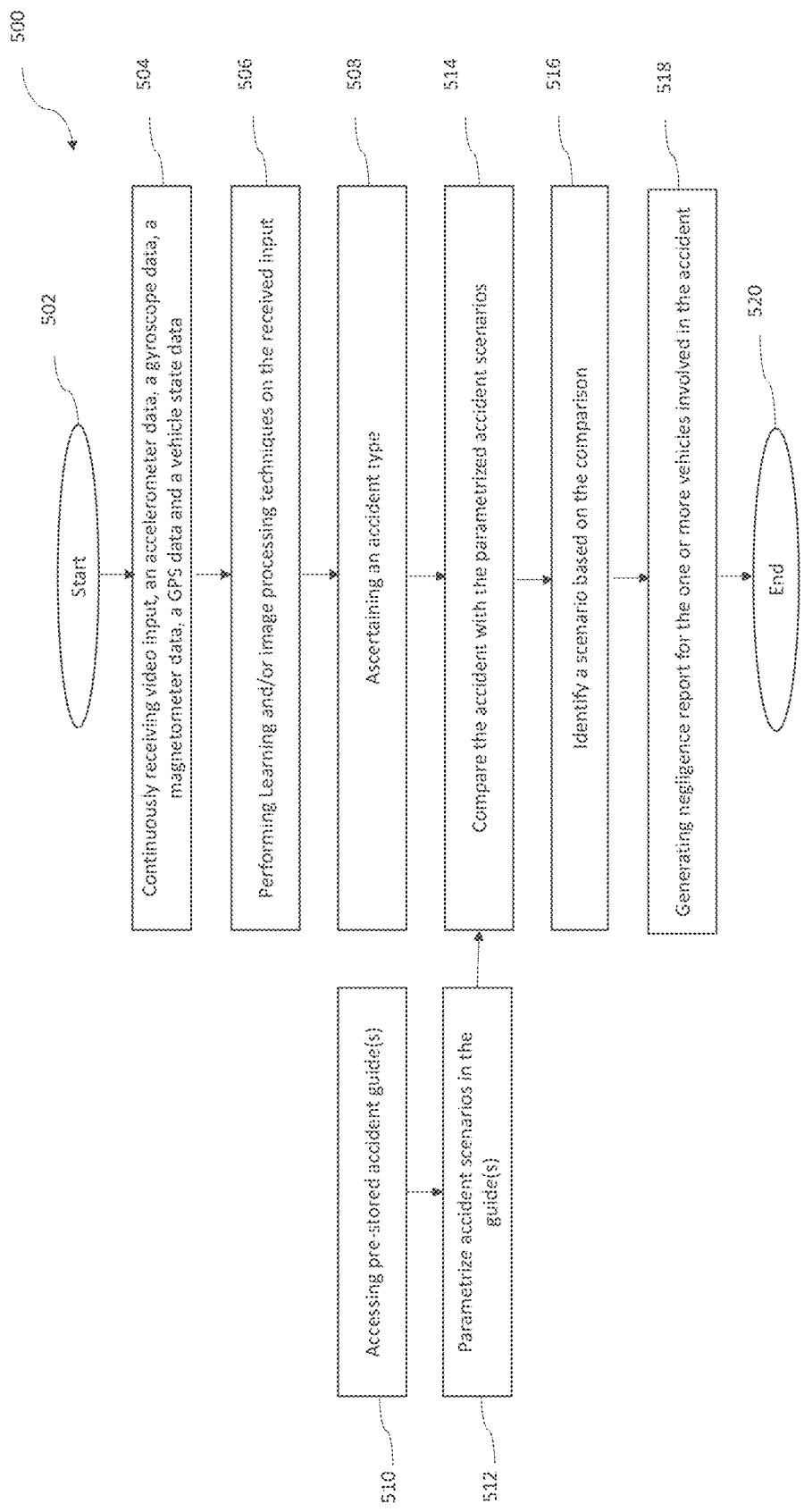
FIG. 5 illustrates an exemplary implementation [500] of the method for comparative negligence assessment, in accordance with another exemplary embodiments of the present invention.

Referring to FIG. 5 illustrates an exemplary implementation [500] of the method for comparative negligence assessment, in accordance with another exemplary embodiments of the present invention. The method starts at step [502] to assess negligence assessment for vehicles involved in an accident. At step [504], the system receives the first data from the accelerometer, the second data from the gyroscope and the third data from the magnetometer, the fourth data from the Lidar sensor and the fifth data from the Radar sensor along with the vehicle state data and the video input. At step [506], the system performs learning and/or image processing techniques on the received input, and ascertains the relative positions & velocities of the one or more vehicles in an accident based on an analysis of the received data. Next, at step [508], the system ascertains the type of the accident from one of a rear-end accident, a head-on accident, a T-bone accident, and a side-swipe accident.

Figure 8B:
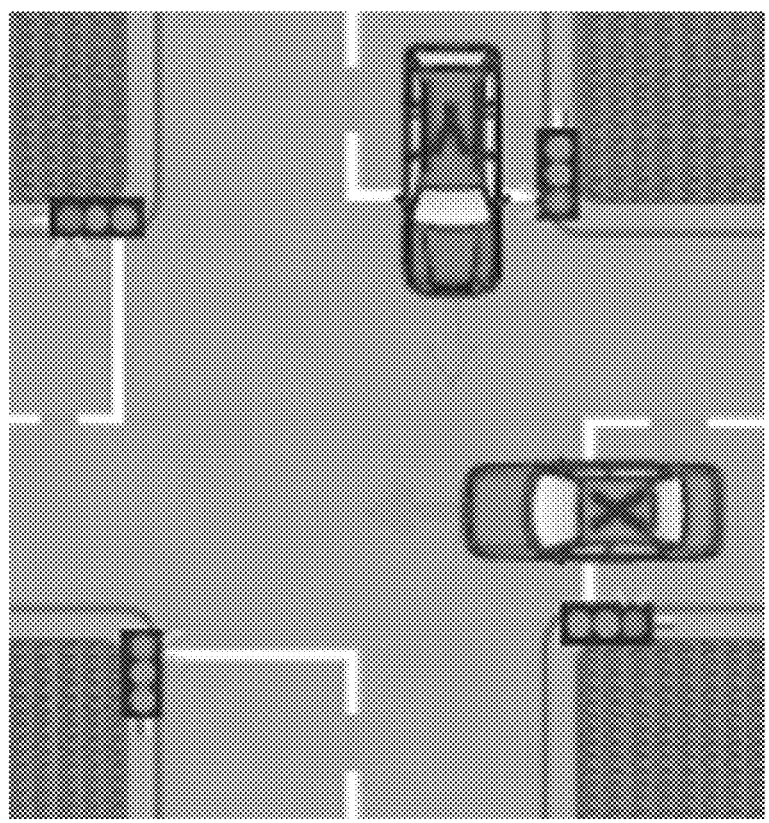
FIGS. 8A and 8B illustrate exemplary accident scenarios, in accordance with another exemplary embodiments of the present invention.
Figure 8A:
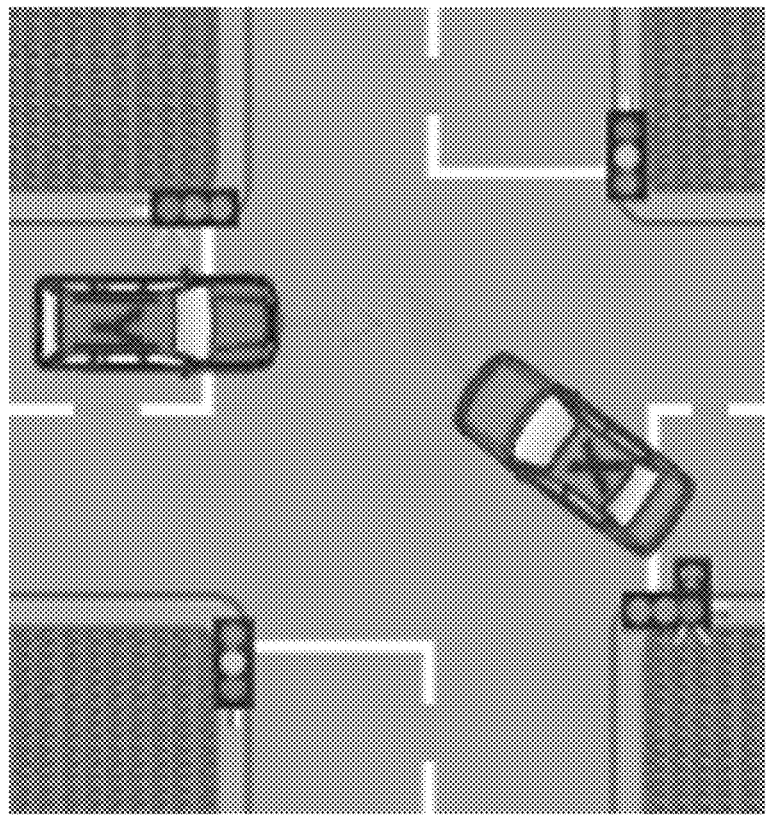

At step [510], the system accesses one or more accident guides, and identify one or more characteristic parameters for one or more accident scenarios listed in the one or more guides at step [512]. For example, as illustrated in FIG. 8A, for a scenario that the traffic lights are showing green for both Vehicle-X and Vehicle-Y and the green arrow in Vehicle-X has not come on/lit up, Driver-Y has right of way but should also keep a lookout for vehicles turning across his path at the junction, and take an evasive action to avoid the collision. Driver-X making right turn should give way to oncoming traffic from the opposite direction. For an accident in such scenario, 85% negligence and culpability is assigned to Vehicle-X while only 15% is assigned to Y. In another example, as illustrated in FIG. 8B, for a scenario that "the traffic light is showing green in favour of vehicle-X and showing red against vehicle-Y", driver of Vehicle-X has right of way and driver of Vehicle-Y approaching from a direction perpendicular to Vehicle-X must stop at the junction in compliance with the red signal. In such accident scenario, 100% negligence and culpability is assigned to Vehicle-Y. The present invention also encompasses that the steps [510]-[512] are performed anytime during the start of the method, i.e. before occurrence of step [502].

Further, at step [514], the system compares the above-received data with the parameterized one or more accident scenarios of the one or more guides, and identifies a scenario that closely matches the accident based on the comparison at step [516]. At step [518], the system generates a negligence report for the one or more vehicles involved in the accident and their comparative negligence and culpability assessment (e.g., score, contribution, etc.). The method completes at step [520].

Figure 6:
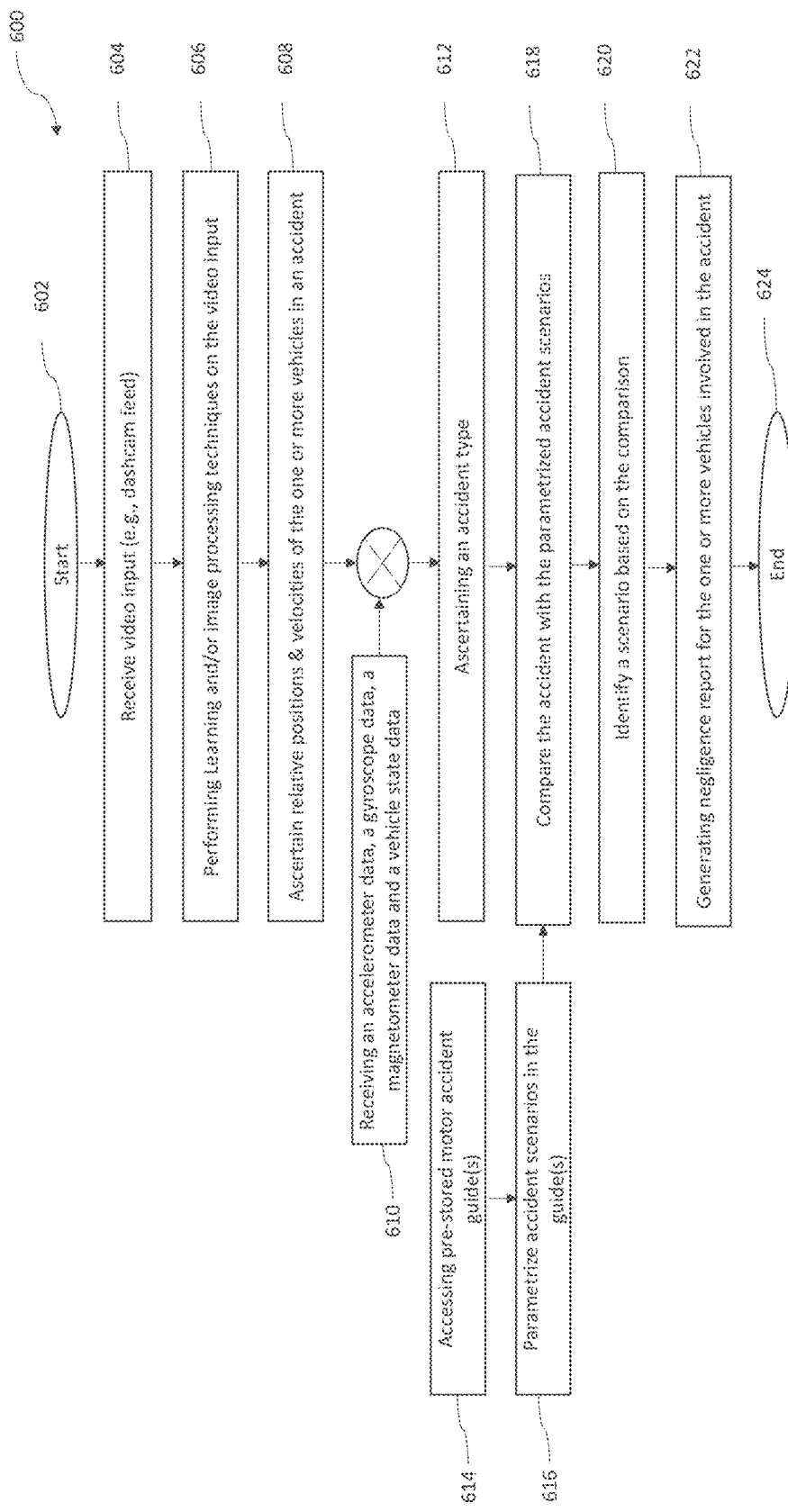
FIG. 6 illustrates another exemplary implementation [600] of the method for comparative negligence assessment, in accordance with another exemplary embodiments of the present invention.

Referring to FIG. 6 illustrates another exemplary implementation [600] of the method for comparative negligence assessment, in accordance with another exemplary embodiments of the present invention. The method starts at step [602] to assess negligence assessment for vehicles involved in an accident. At step [604], receives video input obtained from the dashcam feed of the one or more vehicles. At step [606], the system performs learning and/or image processing techniques on the received input, and ascertains the relative positions & velocities of the one or more vehicles in an accident based on an analysis of the received data at step [608]. At step [610], the system also receives the first data from the accelerometer, the second data from the gyroscope and the third data from the magnetometer, the fourth data from the Lidar sensor and the fifth data from the Radar sensor along with the vehicle state data. Based on the above received inputs, at step [612], the system ascertains the type of the accident from one of a rear-end accident, a head-on accident, a T-bone accident, and a side-swipe accident.

At step [614], the system accesses one or more accident guides, and identify one or more characteristic parameters for one or more accident scenarios listed in the one or more guides at step [616]. For example, as illustrated in FIG. 8A, for a scenario that the traffic lights are showing green for both Vehicle-X and Vehicle-Y and the green arrow in Vehicle-X has not come on/lit up, Driver-Y has right of way but should also keep a lookout for vehicles turning across his path at the junction, and take an evasive action to avoid the collision. Driver-X making right turn should give way to oncoming traffic from the opposite direction. For an accident in such scenario, 85% negligence and culpability is assigned to Vehicle-X while only 15% is assigned to Y. In another example, as illustrated in FIG. 8B, for a scenario that "the traffic light is showing green in favour of vehicle-X and showing red against vehicle-Y", driver of Vehicle-X has right of way and driver of Vehicle-Y approaching from a direction perpendicular to Vehicle-X must stop at the junction in compliance with the red signal. In such accident scenario, 100% negligence and culpability is assigned to Vehicle-Y. The present invention also encompasses that the steps [614]-[616] are performed anytime during the start of the method, i.e. before occurrence of step [602].

Further, at step [618], the system compares the above-received data with the parameterized one or more accident scenarios of the one or more guides, and identifies a scenario that closely matches the accident based on the comparison at step [620]. At step [622], the system generates a negligence report for the one or more vehicles involved in the accident and their comparative negligence and culpability assessment (e.g., score, contribution, etc.). The method completes at step [624].

Figure 7:
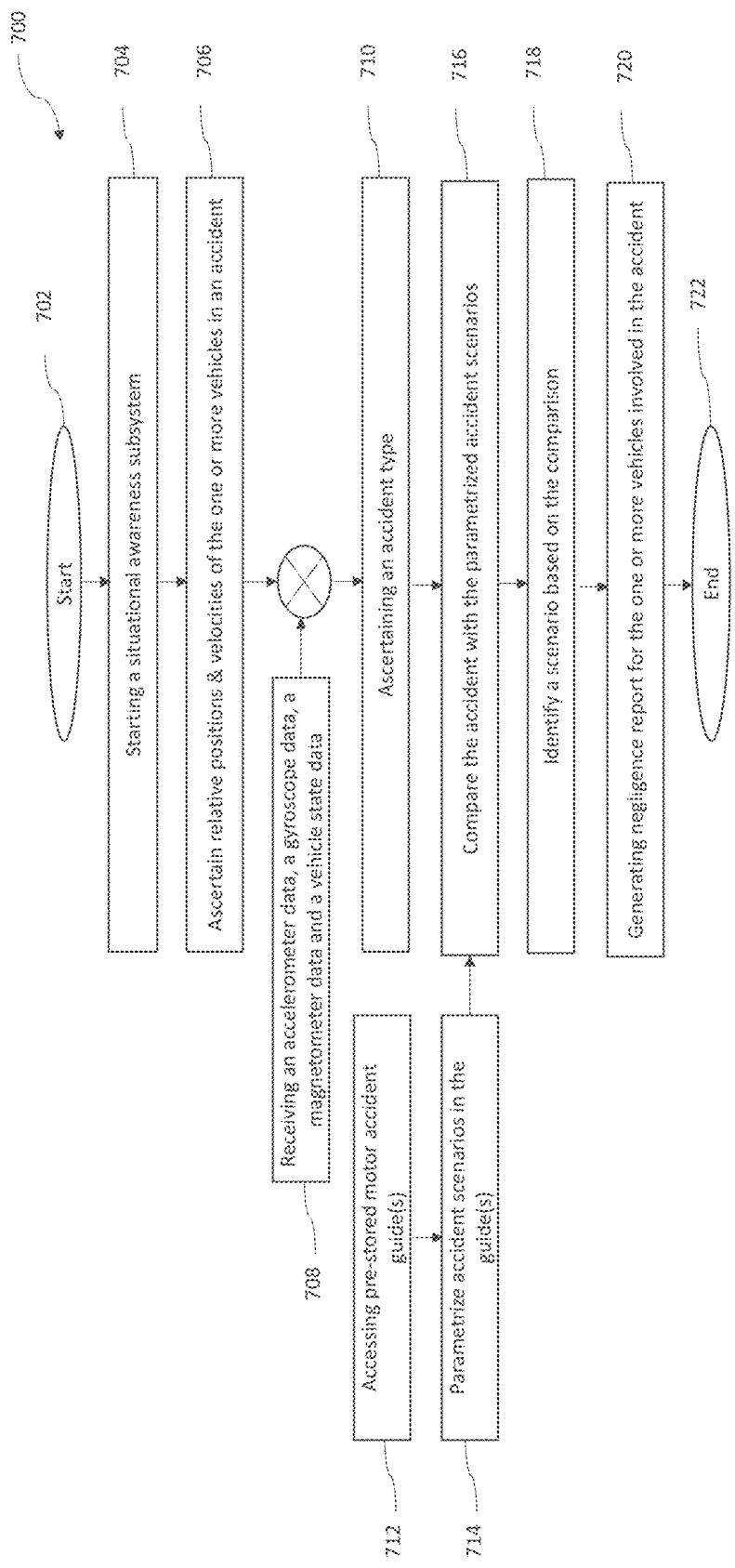
FIG. 7 illustrates yet another exemplary implementation [700] of the method for comparative negligence assessment, in accordance with another exemplary embodiments of the present invention.

Referring to FIG. 7 illustrates yet another exemplary implementation of the system used as a service by the insurance companies wherein end users upload the dashcam videos to a remote server (also referred as the situational awareness subsystem) that is interfaced with an implementation of the invention to automatically determine relative culpability. The method starts at step [702] to assess negligence assessment for vehicles involved in an accident. At step [704], a representative of the insurance company starts the situational awareness subsystem. The system of the present invention ascertains the relative positions & velocities of the one or more vehicles in an accident based on an analysis of the video input provided (obtained from dash cams onboard vehicles, etc.) by the end users to the situational awareness subsystem. At step [708], the system also receives the first data from the accelerometer, the second data from the gyroscope and the third data from the magnetometer, the fourth data from the Lidar sensor and the fifth data from the Radar sensor along with the vehicle state data. Based on the above received inputs, at step [710], the system ascertains the type of the accident from one of a rear-end accident, a head-on accident, a T-bone accident, and a side-swipe accident. At step [712], the system accesses one or more accident guides, and identify one or more characteristic parameters for one or more accident scenarios listed in the one or more guides at step [714].

For example, as illustrated in FIG. 8A, for a scenario that the traffic lights are showing green for both Vehicle-X and Vehicle-Y and the green arrow in Vehicle-X has not come on/lit up, Driver-Y has right of way but should also keep a lookout for vehicles turning across his path at the junction, and take an evasive action to avoid the collision. Driver-X making right turn should give way to oncoming traffic from the opposite direction. For an accident in such scenario, 85% negligence and culpability is assigned to Vehicle-X while only 15% is assigned to Y. In another example, as illustrated in FIG. 8B, for a scenario that "the traffic light is showing green in favour of vehicle-X and showing red against vehicle-Y", driver of Vehicle-X has right of way and driver of Vehicle-Y approaching from a direction perpendicular to Vehicle-X must stop at the junction in compliance with the red signal. In such accident scenario, 100% negligence and culpability is assigned to Vehicle-Y. While the exemplary scenarios of FIGS. 8A-8B are described with respect to vehicle being a car, it should be understood that the invention as described herein is applicable to all types of vehicles.

The present invention also encompasses that the steps [712]-[714] are performed anytime during the start of the method, i.e. before occurrence of step [702]. Further, at step [716], the system compares the above-received data with the parameterized one or more accident scenarios of the one or more guides, and identifies a scenario that closely matches the accident based on the comparison at step [718]. At step [720], the system generates a negligence report for the one or more vehicles involved in the accident and their comparative negligence and culpability assessment (e.g., score, contribution, etc.). The method completes at step [722].

While the exemplary scenarios and embodiments hereinabove are described for automobiles and with respect to road accidents, it will be appreciated by a person of skill in the art that the present invention is extendible to all forms of transportation and types of vehicles. Accordingly the present invention provides a solution for assessment of comparative negligence of the drivers of the one or more vehicles involved in an accident. Accordingly, the present invention automates the process of assessing relative culpability of the parties involved in an accident using sensors and artificial intelligence approaches while minimising the human judgement and human error that exists in previously known systems and methods. Thus, owing to such advancement in comparative negligence assessment, the system and the method of the present invention minimises the time spent in figuring out the relative blame of the parties involved in the accident, for e.g., time spent by the insurance surveyors is decreased substantially.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for automatic assessment of comparative negligence for one or more vehicles involved in an accident, the method comprising:
    continuously receiving for at least one vehicle of the one or more vehicles, at a data input unit, one or more of a video input from a camera unit, a first data from an accelerometer, a second data from a gyroscope, a third data from a magnetometer, a fourth data from a Lidar sensor, a fifth data from a Radar sensor, a GPS data from a GPS unit, a sixth data from a radio navigation unit and a vehicle state data from the at least one vehicle interface;
    automatically detecting, by an accident detection unit, an occurrence of an accident and a timestamp of said accident based on the received data;
    determining, by an accident type detection unit, an accident type of the detected accident based on the received data;
    detecting, by a route tracking unit, a trajectory of the one or more vehicles based on the received data for the detected timestamp;
    generating, by a context builder unit, a scenario for the accident of the detected timestamp based on at least the accident type and the trajectory of the one or more vehicles;
    comparing, by a context matching unit, the generated scenario with a parametrized accident guideline; and
    generating, by a processor, a comparative negligence assessment for the one or more vehicles involved in the accident based on at least the comparison.

2. The method as claimed in claim 1, further comprising detecting, by a driver input unit, an engagement score of a driver of at least one autonomous vehicle of the one or more vehicles based on the received data, wherein the processor generates the comparative negligence assessment for the autonomous vehicle involved in the accident based on at least the engagement score.

3. The method as claimed in claim 1, wherein detecting, by the accident type detection unit, an accident type further comprises:
    extracting, by a spatial feature extractor unit, one or more spatial objects from the video input for the detected timestamp using a combination of convolutional neural networks;
    extracting, by a temporal feature extractor unit, one or more temporal features for the one or more extracted spatial objects from the video input for a pre-defined time period around the timestamp using recurrent neural networks;
    determining the accident type by a classifier unit trained with a dataset of one or more predefined accident types.

4. The method as claimed in claim 1, wherein the detecting, by the accident type detection unit, an accident type further comprises:
    determining a point of impact based on at least one of the first data, the second data, the third data, the fourth data, the fifth data and the sixth data; and
    determining the accident type by a classifier unit trained with a dataset of one or more pre-defined accident types.

5. The method as claimed in claim 1, wherein the one or more vehicles involved in an accident are automobiles, the method further comprising:
    detecting, by a road sign detection unit, one or more road signs for the detected timestamp based on the received data, and
    detecting, by a lane detection unit, one or more lane markings, a position of the one or more vehicles with respect to the one or more lane markings, and a lane driving behaviour of the one or more vehicles in the video input data,
    wherein the context builder unit generates the scenario for the accident based on at least the one or more road signs and the lane driving behaviour of the one or more vehicles.

6. The method as claimed in claim 5, wherein detecting, by the road sign detection unit, the one or more road signs further comprises
    extracting the one or more road signs from the HD maps using the GPS data for the detected timestamp; and
    detecting road signs in the video using convolutional neural networks.

7. The method as claimed in claim 1, wherein the lane detection unit detects the one or more lane markings in the video input using one of a computer vision technique and a deep learning technique, and wherein the lane detection unit detects the lane driving behaviour for the one or more vehicles based on the received data and the position of the one or more vehicles with respect to the one or more lane markings.

8. The method as claimed in claim 1, wherein the route tracking unit detects the trajectory of the one or more vehicles using one of a visual odometry technique, a dead reckoning technique and a generative adversarial neural network.

9. The method as claimed in claim 1, in an event the one or more vehicles involved in an accident are aerial vehicles, the data input unit receives a terrain information, a synthetic environmental data and a flight plan data for at least one vehicle of the one or more vehicles, and wherein the context builder unit generates the scenario for the accident based on the received data.

10. A system for automatic assessment of comparative negligence for one or more vehicles involved in an accident, the system comprising:
- a data input unit configured to continuously receive one or more of a video input from a camera unit, a first data from an accelerometer, a second data from a gyroscope, a third data from a magnetometer, a fourth data from a Lidar sensor, a fifth data from a Radar sensor, a sixth data from a radio navigation unit and a GPS data from a GPS unit, and a vehicle state data from a vehicle interface for at least one vehicle of the one or more vehicles;
- an accident detection unit connected to the data input unit, said accident detection unit configured to automatically detect an occurrence of an accident and a timestamp of said accident based on the received data;
- an accident type detection unit connected to the accident detection unit and the data input unit, said accident type detection unit configured to determine an accident type of the detected accident based on the received data;
- a route tracking unit connected to the accident type detection unit, the accident detection unit and the data input unit, said route tracking unit configured to detect a trajectory of the one or more vehicles based on the received data for the detected timestamp;
- a context builder unit connected to the accident detection unit, the data input unit, the route tracking unit and the accident type detection unit, said context builder unit configured to generate a scenario for the accident for the detected timestamp based on at least the accident type and the trajectory of the one or more vehicles;
- a context matching unit connected to the accident detection unit, the data input unit, the context builder unit, the route tracking unit, the accident type detection unit, said context matching unit configured to compare the generated scenario with a parametrized accident guideline; and
- a processor connected to the accident detection unit, the data input unit, the context matching unit, the context builder unit, the route tracking unit, the accident type detection unit, said processor configured to generate a comparative negligence assessment for the one or more vehicles involved in the accident based on at least the comparison.

11. The system as claimed in claim 10, the system further comprising a driver input unit connected to the accident detection unit, the data input unit, the context matching unit, the context builder unit, the route tracking unit, the accident type detection unit and the processor, said driver input configured to detect an engagement score of a driver of at least one autonomous vehicle of the one or more vehicles based on the received data, wherein the processor generates the comparative negligence assessment for the at least one autonomous vehicle involved in the accident based on at least the engagement score.

12. The system as claimed in claim 10, wherein the accident type detection unit further comprises of:
- a spatial feature extractor unit configured to extract one or more spatial objects from the video input for the detected timestamp using a combination of convolutional neural networks;
- a temporal feature extractor unit configured to extract one or more temporal features for the one or more extracted spatial objects from the video input for a pre-defined time period around the timestamp using recurrent neural networks; and
- a classifier unit trained with a dataset of one or more predefined accident types, said classifier unit configured to determine the accident type based on the trained dataset.

13. The system as claimed in claim 10, wherein the accident type detection unit is further configured to determine a point of impact based on at least one of the first data, the second data, the third data, the fourth data, the fifth data and the sixth data.

14. The system as claimed in claim 13, wherein the accident type detection unit further comprises a classifier unit trained with a data set of one or more pre-defined accident types, said classifier unit configured to determine the accident type.

15. The system as claimed in claim 10, wherein in an event the one or more vehicles involved in an accident are automobiles, further comprising:
- a road sign detection unit connected to the accident detection unit, the data input unit, the context matching unit, the context builder unit, the route tracking unit, the accident type detection unit and the processor, said road sign detection unit configured to detect one or more road signs for the detected timestamp based on the received data; and
- a lane detection unit connected to the road sign detection unit, the accident detection unit, the data input unit, the context matching unit, the context builder unit, the route tracking unit, the accident type detection unit and the processor, said lane detection unit configured to detect one or more lane markings, a position of the one or more vehicles with respect to the one or more lane markings, and a lane driving behaviour of the one or more vehicles based on the video input.

16. The system as claimed in claim 15, wherein the context builder unit is further configured to generate the scenario for the accident based on at least the one or more road signs and the lane driving behaviour of the one or more vehicles.

17. The system as claimed in claim 10, wherein the road sign detection unit is further configured to
- extract the one or more road signs from the HD maps using the GPS data for the detected timestamp; and
- detecting road signs in the video using convolutional neural networks.

18. The system as claimed in claim 10, wherein the lane detection unit further configured to:
- detect the one or more lane markings in the video input using one of a computer vision technique and a deep learning mechanism, and
- detect the lane driving behaviour for the one or more vehicles based on the received data and the position of the one or more vehicles with respect to the one or more lane markings.

19. The system as claimed in claim 10, wherein the route tracking unit is further configured to detect the trajectory of the one or more vehicles using one of a visual odometry technique, a dead reckoning technique and a generative adversarial neural network.

20. The system as claimed in claim 10, wherein the data input unit is further configured to receive a terrain information, a synthetic environmental data and a flight plan data for at least one vehicle of the one or more vehicles in an event the one or more vehicles involved in an accident are aerial vehicles, and wherein the context builder unit generates the scenario for the accident based on the received data.

\* \* \* \* \*